United States Patent
Lu et al.

(10) Patent No.: US 12,027,894 B2
(45) Date of Patent: Jul. 2, 2024

(54) POWER TRANSMISSION SYSTEM AND METHOD

(71) Applicant: DELTA ELECTRONICS, INC., Taoyuan (TW)

(72) Inventors: Ting-Yun Lu, Taoyuan (TW); Cheng-Yi Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 151 days.

(21) Appl. No.: 17/663,664

(22) Filed: May 16, 2022

(65) Prior Publication Data

US 2023/0208154 A1   Jun. 29, 2023

(30) Foreign Application Priority Data

Dec. 28, 2021 (TW) ................................ 110149143

(51) Int. Cl.
*H02J 7/00* (2006.01)
(52) U.S. Cl.
CPC ............ *H02J 7/0024* (2013.01); *H02J 7/007* (2013.01); *H02J 2207/20* (2020.01)
(58) Field of Classification Search
CPC ...... H02J 7/0024; H02J 7/007; H02J 2207/20; H02J 7/0068; H02J 7/00712; H02J 7/00032
See application file for complete search history.

(56) References Cited

U.S. PATENT DOCUMENTS

| | | | |
|---|---|---|---|
| RE45,897 E | 2/2016 | Naumann et al. | |
| 10,658,849 B2 | 5/2020 | Syouda | |
| 2009/0327395 A1* | 12/2009 | Park ...................... | H04W 8/005 709/202 |
| 2014/0300310 A1 | 10/2014 | Caren | |
| 2017/0229892 A1* | 8/2017 | Kobayashi ........ | H02J 7/007182 |

(Continued)

FOREIGN PATENT DOCUMENTS

| | | |
|---|---|---|
| CN | 103534859 B | 3/2017 |
| CN | 105210258 B | 4/2019 |
| CN | 111146831 A | 5/2020 |

(Continued)

*Primary Examiner* — Elim Ortiz
(74) *Attorney, Agent, or Firm* — CKC & Partners Co., LLC (57) ABSTRACT

The disclosure provides a power transmission system and method. The power transmission method includes: determining to perform a charging operation or a discharge operation between a battery module and a power supplying/receiving module according to a handshake procedure performed by a power transmission module. Performing the charging operation includes: adjusting a supply voltage outputted by the power supplying/receiving module; and converting the supply voltage into a charging voltage received by the battery module to charge the battery module. Performing the discharging operation includes: converting a discharge voltage outputted by the battery module into a required voltage required by the power supplying/receiving module to supply the power supplying/receiving module. The charging operation or the discharging operation is performed in a maximum power mode, an optimal efficiency mode or a combination thereof between the battery module and the power supplying/receiving module.

16 Claims, 8 Drawing Sheets

(56) References Cited

U.S. PATENT DOCUMENTS

2020/0014252 A1   1/2020   Wan et al.

FOREIGN PATENT DOCUMENTS

| EP | 3627676 | A1 | 3/2020 |
| JP | 2001258166 | A | 9/2001 |
| JP | 2017138870 | A | 8/2017 |
| JP | 2020522221 | A | 7/2020 |
| JP | 2021511000 | A | 4/2021 |
| JP | 2021083285 | A | 5/2021 |
| JP | 2021519055 | A | 8/2021 |
| TW | I290896 | B | 12/2007 |
| TW | 201103220 | A1 | 1/2011 |

* cited by examiner

POWER TRANSMISSION SYSTEM AND METHOD

CROSS-REFERENCE TO RELATED APPLICATION

This application claims priority to Taiwan Application Serial Number 110149143, filed Dec. 28, 2021, which is herein incorporated by reference in its entirety.

BACKGROUND

Field of Invention

This disclosure relates to power transmission system and method, and in particular to the power transmission system and method capable of elastically adjusting operation mode thereof.

Description of Related Art

After finishing the handshake procedure with the power supply terminal and the power receiving terminal, current power transmission module would perform the charging and discharging operations by a fixed voltage conversion. However, such restrictions are often prone to some problems. For example, it is not suitable for a system with requirement for different voltage conversion, and the voltage difference between two terminals of the power transmission module is too large, which results in poor conversion efficiency.

SUMMARY

An aspect of present disclosure relates to a power transmission system. The power transmission system includes a power transmission module, a power supplying/receiving module and a battery module. The power supplying/receiving module is coupled to the power transmission module. The battery module includes at least one battery unit, is coupled to the power transmission module and is configured to perform a charging operation or a discharging operation through the power transmission module and the power supplying/receiving module. When the battery module performs the charging operation, the power transmission module is configured to adjust a supply voltage outputted by the power supplying/receiving module according to handshake information and is configured to convert the supply voltage into a charging voltage received by the battery module to charge the at least one battery unit. When the battery module performs the discharging operation, the power transmission module is configured to convert a discharge voltage outputted by the battery module into a required voltage required by the power supplying/receiving module to supply the power supplying/receiving module. The battery module performs the charging operation or the discharging operation in a maximum power mode, an optimal efficiency mode or a combination thereof with the power supplying/receiving module.

Another aspect of present disclosure relates to a power transmission method. The power transmission method is applied to a power transmission module and includes: determining to perform a charging operation or a discharge operation between a battery module and a power supplying/receiving module according to a handshake procedure performed by the power transmission module. Performing the charging operation includes: adjusting a supply voltage outputted by the power supplying/receiving module; and converting the supply voltage into a charging voltage received by the battery module to charge at least one battery unit of the battery module. Performing the discharging operation includes: converting a discharge voltage outputted by the battery module into a required voltage required by the power supplying/receiving module to supply the power supplying/receiving module. The charging operation or the discharging operation is performed in a maximum power mode, an optimal efficiency mode or a combination thereof between the battery module and the power supplying/receiving module.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
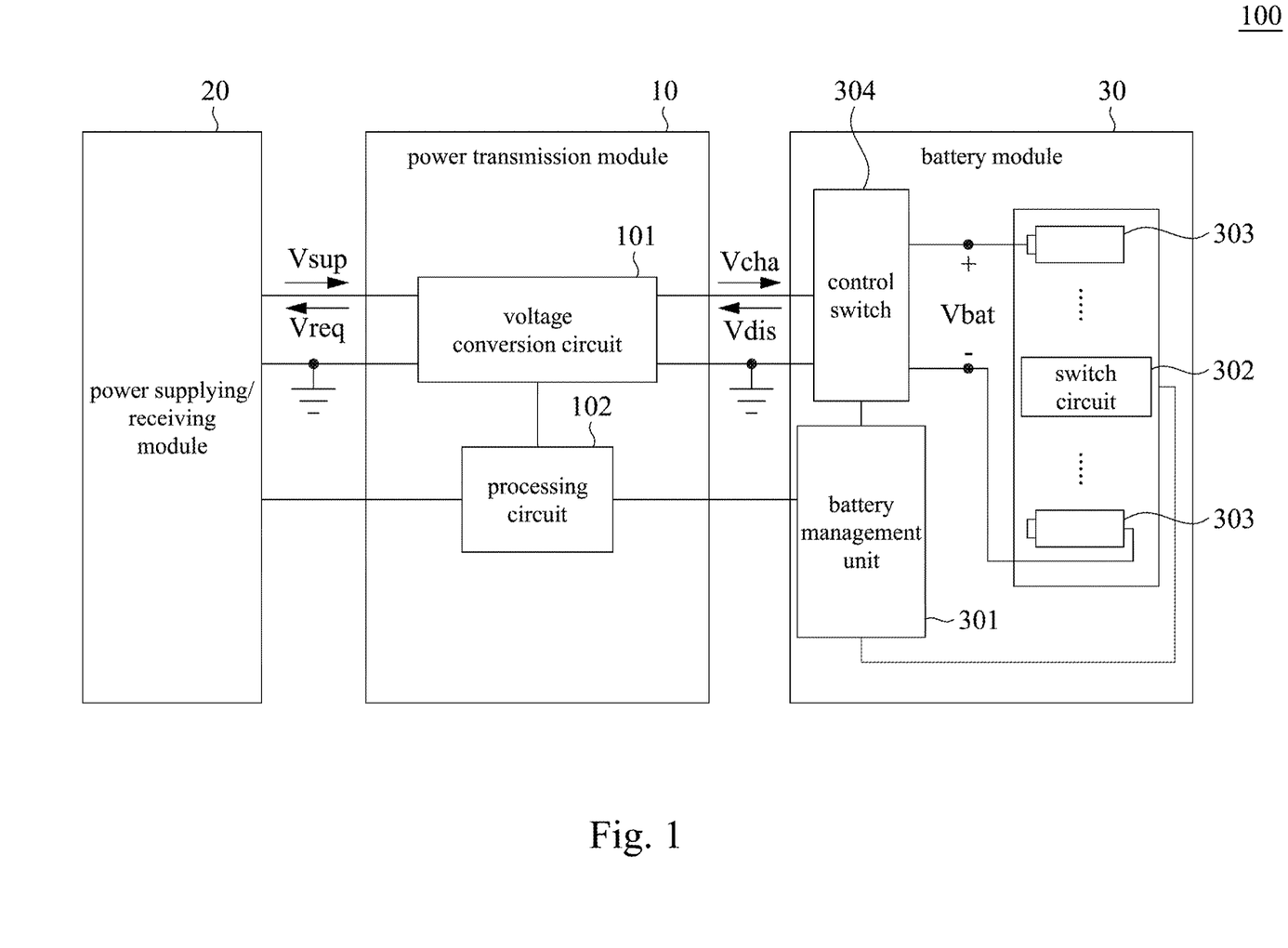
FIG. 1 is a schematic diagram of a power transmission system in accordance with some embodiments of the present disclosure.

Referring to FIG. 1, FIG. 1 is a schematic diagram of a power transmission system 100 in accordance with some embodiments of the present disclosure. In some embodiments, the power transmission system 100 includes a power transmission module 10, a power supplying/receiving module 20 and a battery module 30. In particular, the power transmission module 10 is coupled between the power supplying/receiving module 20 and the battery module 30 and is configured as an adapting device between the power supplying/receiving module 20 and the battery module 30 to facilitate a power transmission between the power supplying/receiving module 20 and the battery module 30.

In some embodiments, the power transmission module 10 includes a voltage conversion circuit 101 and a processing circuit 102. The voltage conversion circuit 101 is configured to perform a voltage conversion. The processing circuit 102 is coupled to the voltage conversion circuit 101, the power supplying/receiving module 20 and the battery module 30, is configured to perform a handshake procedure with the battery module 30 and the power supplying/receiving module 20 to obtain handshake information (e.g., an operable power range, an operable voltage range and an operable current range of each of the power transmission module 10, the power supplying/receiving module 20 and the battery module 30) and is configured to control the voltage conversion circuit 101 and transmit a control request (not shown) to the power supplying/receiving module 20 and the battery module 30 according to the handshake information.

It can be appreciated that the voltage conversion circuit 101 can be implemented by a buck convertor, a boost convertor, a buck-boost convertor, a flyback convertor, or a combination thereof, and the processing circuit 102 can be implemented by one or more central processing unit (CPU), application-specific integrated circuit (ASIC), microprocessor, system on a Chip (SoC) or other suitable processing units.

In some embodiments, the battery module 30 includes a battery management unit 301, at least one switch circuit 302, a plurality of battery units 303 and a control switch 304. As shown in FIG. 1, the battery management unit 301 is coupled to the processing circuit 102, the switch circuit 302, the battery units 303 and the control switch 304. The switch circuit 302 is coupled to the battery units 303, and the control switch 304 is coupled between the battery units 303 and the voltage conversion circuit 101. It can be appreciated that the connecting structures between the switch circuit 302 and the battery units 303 in FIG. 1 are omitted for convenience and simplification of description. Although it is not directly illustrated in FIG. 1, the battery management unit 301 can also be directly coupled to the battery units 303 and the switch circuit 302. In addition, the number of the battery units 303 is not limited to the number (i.e., 2) as shown in FIG. 1.

The battery management unit 301 is configured to control the switch circuit 302 according to the control request outputted by the processing circuit 102 to change a series-parallel structure of the battery units 303, so as to adjust a battery voltage Vbat. In particular, the battery units 303 can be all connected in series or in parallel and also can be partly connected in series and partly connected in parallel. It can be appreciated that the battery voltage Vbat is generated according to the series-parallel structure of the battery units 303. In other words, different series-parallel structures of the battery units 303 would correspond to different battery voltages Vbat. For example, the series-parallel structures of the battery units 303 at least include five series by four parallel (5S4P), ten series by two parallel (10S2P) and twenty series by one parallel (20S1P), wherein the battery voltage Vbat corresponding to the structure of 5S4P can be 20V (volts), the battery voltage Vbat corresponding to the structure of 10S2P can be 40V, and the battery voltage Vbat corresponding to the structure of 20S1P can be 80V. It can be appreciated that the structure of 5S4P represents that the battery module 30 includes four parallel-connected battery strings, and each of the battery strings includes five series-connected battery units 303. The configuration of other series-parallel structures can be deduced by analogy, and therefore the descriptions thereof are omitted herein.

Furthermore, the battery management unit 301 is further configured to receive battery information, such as battery voltage, battery temperature, etc., of each of the battery units 303. In addition, the battery management unit 301 is further configured to conduct or interrupt the connection between the battery units 303 and the voltage conversion circuit 101 by the control switch 304. The processing circuit 102 can control the control switch 304 through the battery management unit 301 to conduct the connection between the battery units 303 and the voltage conversion circuit 101 after determining to perform the voltage conversion. That is, when the voltage conversion has not been performed, the processing circuit 102 can interrupt the connection between the battery units 303 and the voltage conversion circuit 101 through the control switch 304. It can be appreciated that the control switch 304 in the battery module 30 can be omitted in other embodiments.

In some embodiments, the power supplying/receiving module 20 can be a power supply, is configured to provide a supply voltage Vsup to the power transmission module 10 and is configured to adjust the magnitude of the supply voltage Vsup according to the control request outputted by the processing circuit 102. As shown in FIG. 1, the power transmission module 10 can convert the supply voltage Vsup into a charging voltage Vcha according to the magnitude of the battery voltage Vbat of the battery module 30 to charge the battery units 303.

In other embodiments, the power supplying/receiving module 20 can be an electronic device (e.g., household appliance, electric transit carrier) and can request a required voltage Vreq. As shown in FIG. 1, the battery module 30 can output a discharge voltage Vdis to the power transmission module 10 by the battery voltage Vbat. The power transmission module 10 can convert the discharge voltage Vdis into the required voltage Vreq to facilitate the normal operation of the power supplying/receiving module 20.

Figure 2:
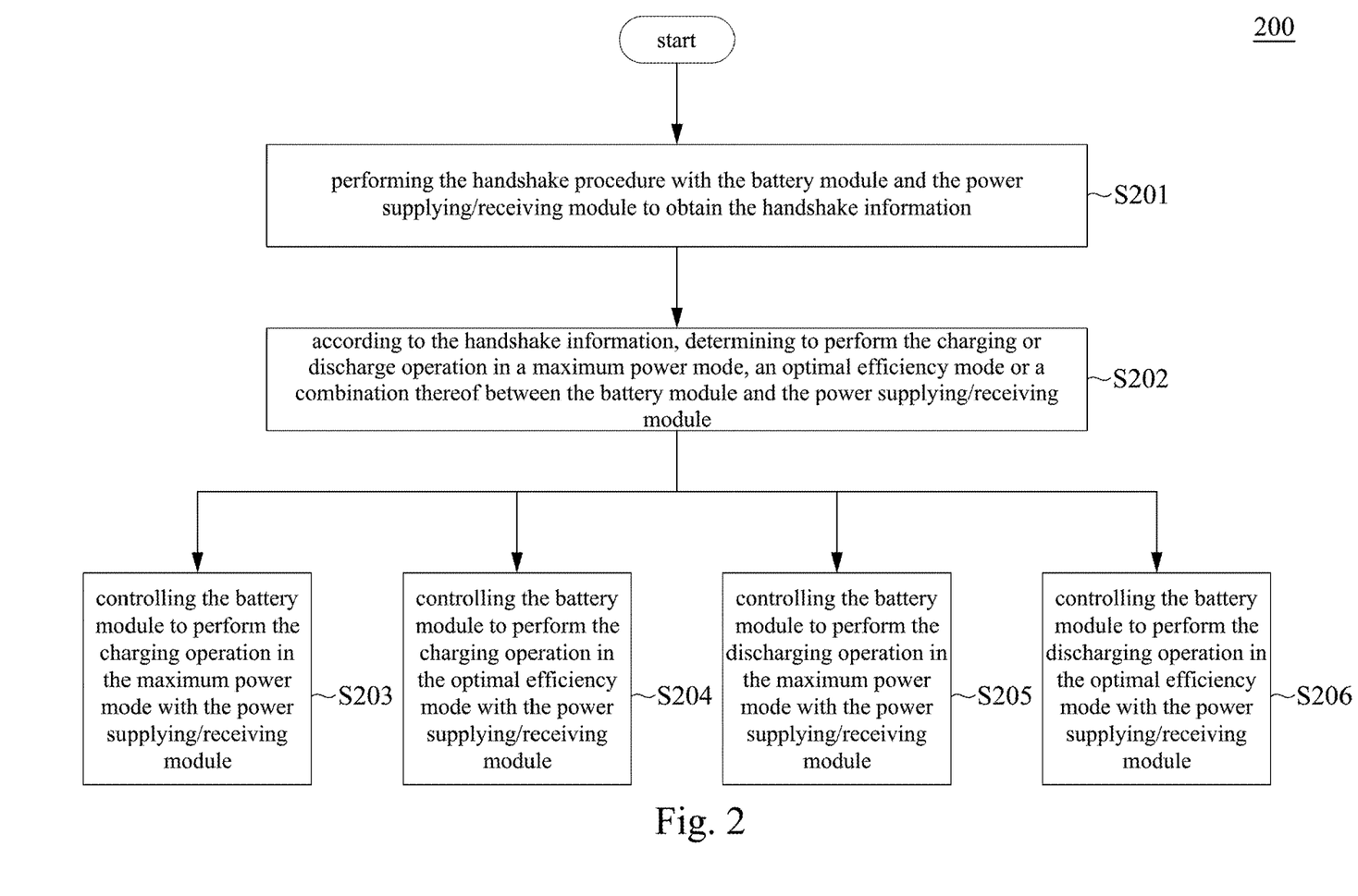
FIG. 2 is a flow diagram of a power transmission method in accordance with some embodiments of the present disclosure.

The operation of the power transmission system 100 would be described in detail below with reference to FIG. 2. Referring to FIG. 2, FIG. 2 is a flow diagram of a power transmission method 200 in accordance with some embodiments of the present disclosure. The power transmission method 200 can be executed by the power transmission module 10 of FIG. 1. However, the present disclosure is not limited herein. As shown in FIG. 2, the power transmission method 200 includes steps S201-S206.

In step S201, the power transmission module 10 performs the handshake procedure with the battery module 30 and the power supplying/receiving module 20 to obtain the handshake information. For example, the processing circuit 102 of the power transmission module 10 can exchange information with the battery management unit 301 of the battery module 30 and a control circuit (not shown) of the power supplying/receiving module 20.

In step S202, the power transmission module 10 determines to perform a charging or discharging operation in a maximal power mode, an optimal efficiency mode or a combination thereof between the battery module 30 and the power supplying/receiving module 20 according to the handshake information.

In some embodiments, the power transmission module 10 determines to perform the charging operation in the maximal power mode between the battery module 30 and the power supplying/receiving module 20, so as to execute step S203. In step S203, the power transmission module 10 controls the battery module 30 to perform the charging operation in the maximal power mode with the power supplying/receiving module 20. It can be appreciated that "the power transmission module controls the power supplying/receiving module and/or the battery module" as used herein represents that the power transmission module can transmit the control request to the power supplying/receiving module and/or the battery module by the internal processing circuit thereof to indirectly control the power supplying/receiving module and/or the battery module. In practical, the power supplying/receiving module utilize the internal control circuit thereof to receive the control request and to perform related operations according to the control request, and the battery module utilizes the battery management unit to receive the control request and to perform related operations according to the control request. The charging operation that the battery module 30 performs in the maximum power mode would be described in detail below with reference to FIG. 3.

Figure 3:
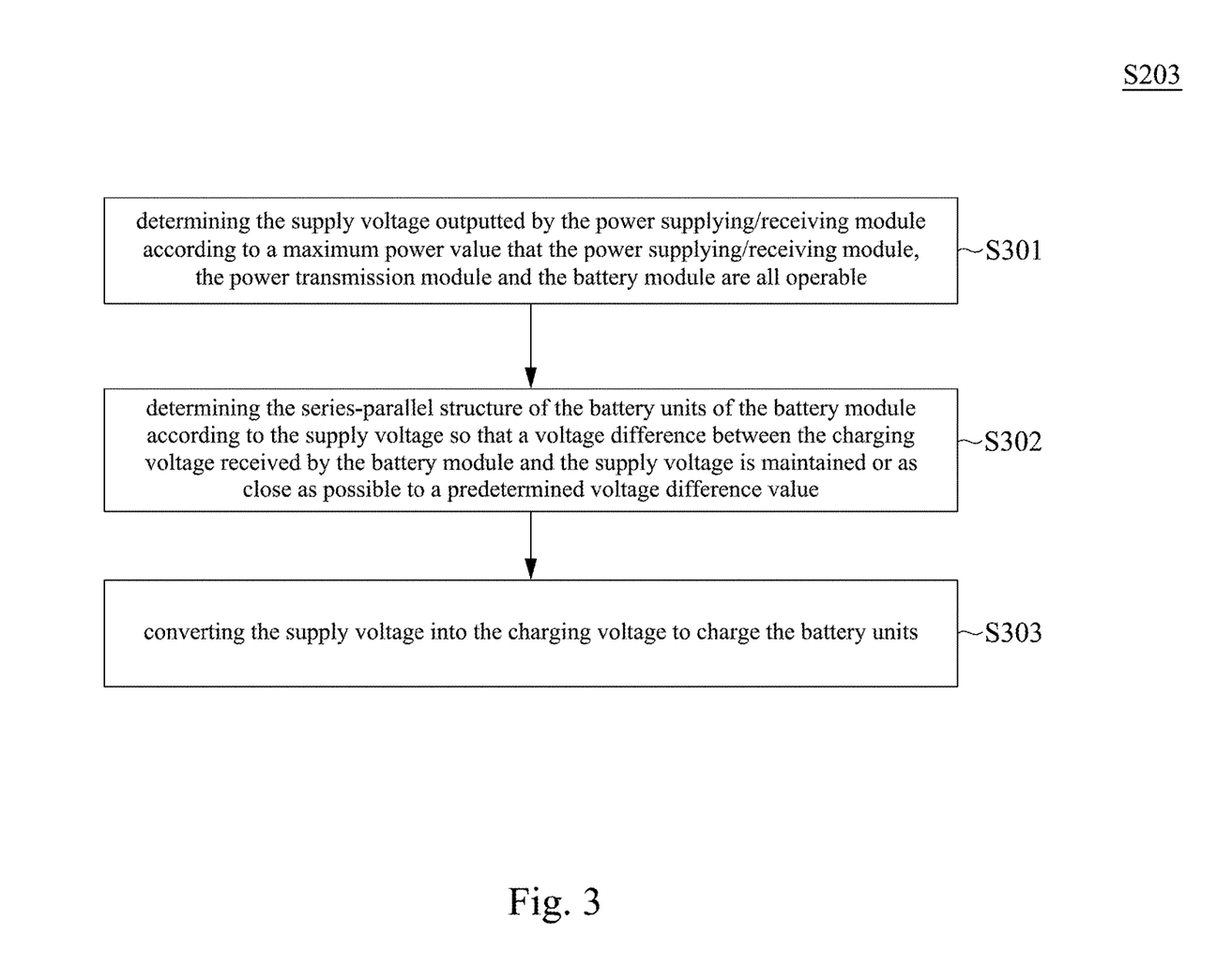
FIG. 3 is a flow diagram of one of steps of the power transmission method of FIG. 2.

Referring to FIG. 3, FIG. 3 is a flow diagram that the battery module 30 performs the charging operation in the maximum power mode in accordance with some embodiments of the present disclosure. As shown in FIG. 3, step S203 includes sub-steps S301-S303. In step S301, the power transmission module 10 determines the supply voltage Vsup outputted by the power supplying/receiving module 20 according to a maximum power value that the power supplying/receiving module 20, the power transmission module 10 and the battery module 30 are all operable. For example, a maximum current value that a transmission cable (e.g., USB Type-C) coupled between the power transmission module 10 and the power supplying/receiving module 20 can transmit is 5A (ampere), and the power supplying/receiving module 20 can output the voltage in the range of 5 to 48V. In such condition, the maximum power value of the power supplying/receiving module 20 is 240 W (watt). If determining that both the power transmission module 10 and the battery module 30 can also load the power value of 240 W, the power transmission module 10 can control the power supplying/receiving module 20 to output the supply voltage Vsup of 48V by the processing circuit 102, so that the power supplying/receiving module 20 can output at the maximum power value (e.g., 240 W).

In sub-step S302, the power transmission module 10 determines the series-parallel structure of the battery units 303 of the battery module 30 according to the supply voltage Vsup, so that a voltage difference between the charging voltage Vcha and the supply voltage Vsup is maintained or as close as possible to a predetermined voltage difference value. For example, the predetermined voltage difference value is 2V. If the battery units 303 has the structure of 10S2P (which is corresponding to the battery voltage of 40V), the voltage difference between the charging voltage Vcha (e.g., 30-42V) received by the battery module 30 and the supply voltage Vsup (e.g., 48V) can be as close as possible to 2V. Accordingly, the power transmission module 10 informs the battery management unit 301 to adjust the series-parallel structure of the battery units 303 to be 10S2P.

In sub-step S303, the power transmission module 10 converts the supply voltage Vsup into the charging voltage Vcha to charge the battery units 303. For example, the power transmission module 10 converts the supply voltage Vsup (e.g., 48V) into the charging voltage Vcha by the voltage conversion circuit 101 of FIG. 1. It can be appreciated that the charging voltage Vcha can be a nonconstant voltage (e.g., 30-42V) which is changed according to an electric quantity that the battery units 303 change during a charging procedure. Notably, the voltage conversion circuit 101 has an optimal conversion efficiency when a voltage difference between input voltage and output voltage thereof is the predetermined voltage difference value (for example, the input voltage is 2V higher than the output voltage). Since the power supplying/receiving module 20 can output at the maximum power value (i.e., step S301) and the voltage difference between the charging voltage Vcha and the supply voltage Vsup is as close as possible to the predetermined voltage difference value (i.e., step S302), the conversion efficiency of the power transmission module 10 and the charging efficiency of the battery module 30 can be increased.

In some embodiments, the power transmission module 10 determines to perform the charging operation in the optimal efficiency mode between the battery module 30 and the power supplying/receiving module 20, so as to execute step S204. As shown in FIG. 2, in step S204, the power transmission module 10 controls the battery module 30 to perform the charging operation in the optimal efficiency mode with the power supplying/receiving module 20. The charging operation that the battery module 30 performs in the optimal efficiency mode would be described in detail below with reference to FIG. 4.

Figure 4:
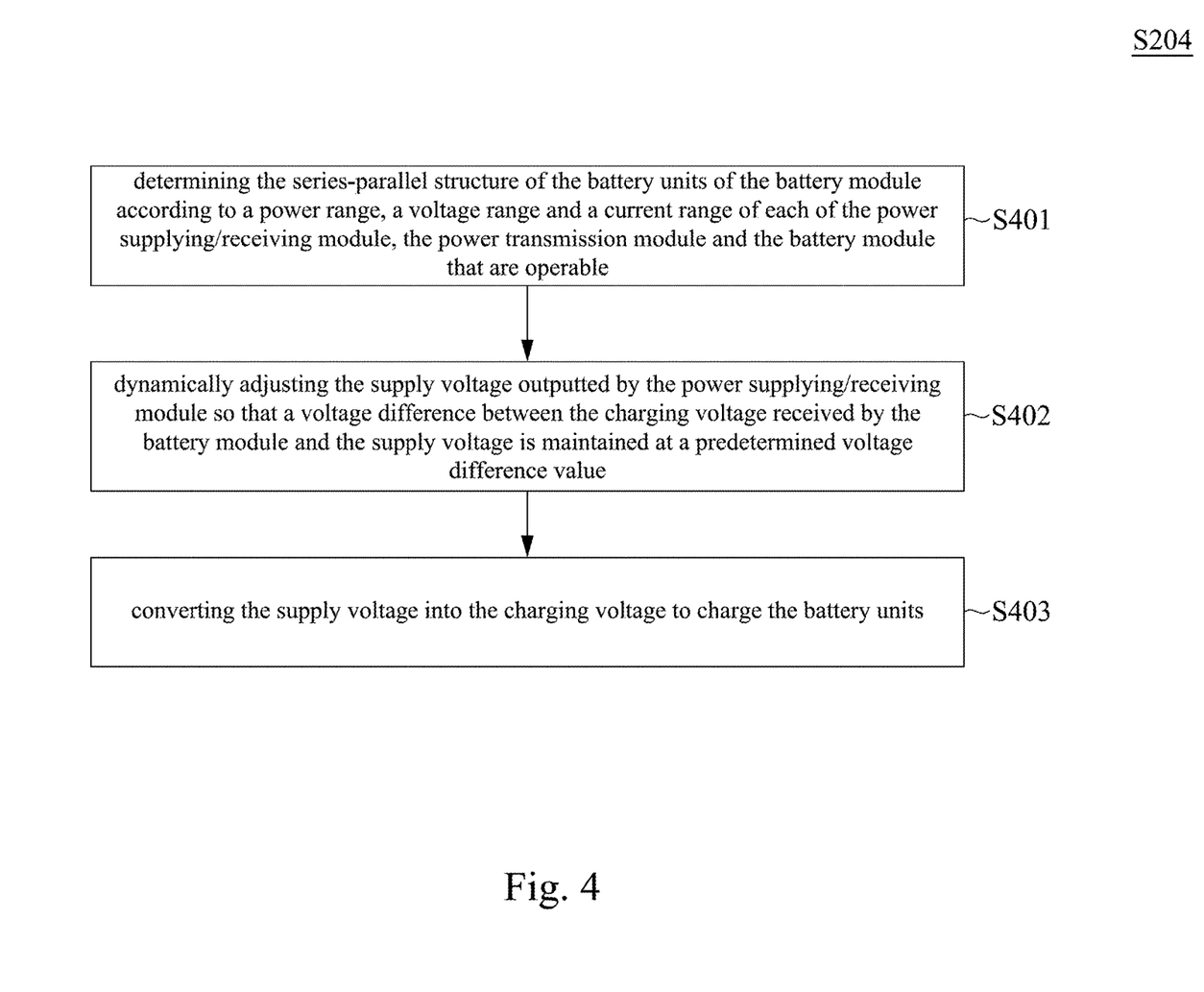
FIG. 4 is a flow diagram of one of steps of the power transmission method of FIG. 2.

Referring to FIG. 4, FIG. 4 is a flow diagram that the battery module 30 performs the charging operation in the optimal efficiency mode in accordance with some embodiments of the present disclosure. As shown in FIG. 4, step S204 includes sub-steps S401-S403. In step S401, the power transmission module 10 determines the series-parallel structure of the battery units 303 of the battery module 30 according to a power range, a voltage range and a current range of each of the power supplying/receiving module 20, the power transmission module 10 and the battery module 30 that are operable. For example, the supply voltage Vsup outputted by the power supplying/receiving module 20 ranges from 5 to 48V, and the battery voltage Vbat generated by the battery units 303 can be 20, 40 or 80V. Accordingly, the power transmission module 10 can inform the battery management unit 301 to adjust the series-parallel structure of the battery units 303 to be 10S2P (which is corresponding to the battery voltage of 40V), so as to execute sub-step S402.

In sub-step S402, the power transmission module 10 dynamically adjusts the supply voltage Vsup outputted by the power supplying/receiving module 20 so that the voltage difference between the charging voltage Vcha received by the battery module 30 and the supply voltage Vsup is maintained at the predetermined voltage difference value. For example, if the battery units 303 has the structure of 10S2P, the charging voltage Vcha may be changed in the range of 30 to 42V during the charging procedure. Accordingly, the power transmission module 10 would continually adjust the magnitude of the supply voltage Vsup according to the magnitude of the charging voltage Vcha during the charging procedure, so that the voltage difference between the supply voltage Vsup and the charging voltage Vcha is maintained at 2V (i.e., the predetermined voltage difference value). In some practical applications, the supply voltage Vsup (e.g., 32-44V) is continually adjusted to be maintained to be 2V higher than the charging voltage Vcha.

In sub-step S403, the power transmission module 10 converts the supply voltage Vsup into the charging voltage Vcha to charge the battery units 303. It can be appreciated that if the voltage difference between the charging voltage Vcha and the supply voltage Vsup is maintained at the predetermined voltage difference value, the power transmission module 10 continually operates at an optimal operating point (that is, the voltage difference between the input voltage and the output voltage thereof is the predetermined voltage difference value). In such way, the conversion efficiency of the power transmission module 10 can always be maintained at the optimal conversion efficiency, and the charging efficiency of the battery module 30 can be increased.

In some embodiments, the power transmission module 10 determines that the battery module 30 performs the charging operation in the combination of the maximum power mode and the optimal efficiency mode with the power supplying/receiving module 20 (which would be described in detail below by taking multiple practical applications as example). In a practical application, the predetermined voltage difference value is 2V (for example, the supply voltage Vsup is 2V higher than the charging voltage Vcha), the charging voltage Vcha varies in the range of 30 to 42V, but the maximum value of the supply voltage Vsup is 36V. In such condition, when the charging voltage Vcha is lower than 34V, the power transmission module 10 can control the power supplying/receiving module 20, so that the voltage difference between the charging voltage Vcha and the supply voltage Vsup is maintained at the predetermined voltage difference value. However, when the charging voltage Vcha exceeds 34V, the voltage difference between the charging voltage Vcha and the supply voltage Vsup is unable to be maintained at the predetermined voltage difference value. Accordingly, the power transmission module 10 would control the power supplying/receiving module 20 to output at the maximum supply voltage Vsup (which is equivalent of outputting at the maximum power value), so that the voltage difference between the charging voltage Vcha and the supply voltage Vsup is as close as possible to the predetermined voltage difference value.

In another practical application, the predetermined voltage difference value is 2V (for example, the supply voltage Vsup is 2V higher than the charging voltage Vcha), the charging voltage Vcha varies in the range of 15 to 21V, but the supply voltage Vsup is in the range of 20 to 36V. In such condition, when the charging voltage Vcha is lower than 18V, the voltage difference between the charging voltage Vcha and the supply voltage Vsup is unable to be maintained at 2V (i.e., the predetermined voltage difference value). Accordingly, the power transmission module 10 controls the power supplying/receiving module 20 to output at the minimum supply voltage Vsup (i.e., 20V), so that the voltage difference between the charging voltage Vcha and the supply voltage Vsup is as close as possible to the predetermined voltage difference value. When the charging voltage Vcha exceeds 18V, the power transmission module 10 can control the power supplying/receiving module 20, so that the voltage difference between the charging voltage Vcha and the supply voltage Vsup is maintained at the predetermined voltage difference value.

In yet another practical application, the predetermined voltage difference value is 2V (for example, the supply voltage Vsup is 2V higher than the charging voltage Vcha), the maximum current value that the transmission cable can load is 5A, the supply voltage Vsup is in the range of 5 to 36V, but the maximum power value that the voltage conversion circuit 101 can convert is 150 W. In such condition, because the battery units 303 is unable to perform the charging operation in the maximum power mode when having the structure of 5S4P and is unable to perform the charging operation in the optimal efficiency mode when having the structure of 20S1P, the power transmission module 10 adjusts the battery units 303 to be the structure of 10S2P (which is corresponding to the battery voltage Vbat of 40V) according to the above information. When the series-parallel structure of the battery units 303 is 10S2P, the charging voltage Vcha varies in the range of 24 to 42V. During the charging procedure of the battery module 30, when the charging voltage Vcha is lower than 28 V, the power transmission module 10 controls the power supplying/receiving module 20 to output the supply voltage Vsup of 30V. Then, when the charging voltage Vcha exceeds 28 V, the power transmission module 10 controls the power supplying/receiving module 20 to gradually increase the supply voltage Vsup from 30V, so that the voltage difference between the charging voltage Vcha and the supply voltage Vsup is maintained at the predetermined voltage difference value until the supply voltage Vsup is increased to 36V. It can be appreciated that when the supply voltage Vsup is 30V, the power supplying/receiving module 20 outputs at the current of 5 A so as to maintain the output power thereof at 150 W (which is equivalent of outputting at the maximum power value that the voltage conversion circuit 101 can convert, that is, increases the charging efficiency). When the supply voltage Vsup exceeds 30V, the power supplying/receiving module 20 would correspondingly decrease the output current value so as to maintain the output power thereof at 150 W (that is, maintains the charge speed and increases conversion efficiency).

It can be seen from the above practical applications that during the charging procedure of the battery module 30, the conversion efficiency of the power transmission module 10 may not always be maintained at the optimal conversion efficiency. Accordingly, during the charging procedure of the battery module 30, the power transmission module 10 can be switched between different operating modes, depending on the condition (that is, to be operated in the combination of the maximum power mode and the optimal efficiency mode).

In some embodiments, the power transmission module 10 determines to perform the discharging operation in the maximal power mode between the battery module 30 and the power supplying/receiving module 20, so as to execute step S205. In step S205, the power transmission module 10 controls the battery module 30 to perform the discharging operation in the maximal power mode with the power supplying/receiving module 20. The discharging operation that the battery module 30 performs in the maximum power mode would be described in detail below with reference to FIG. 5.

Figure 5:
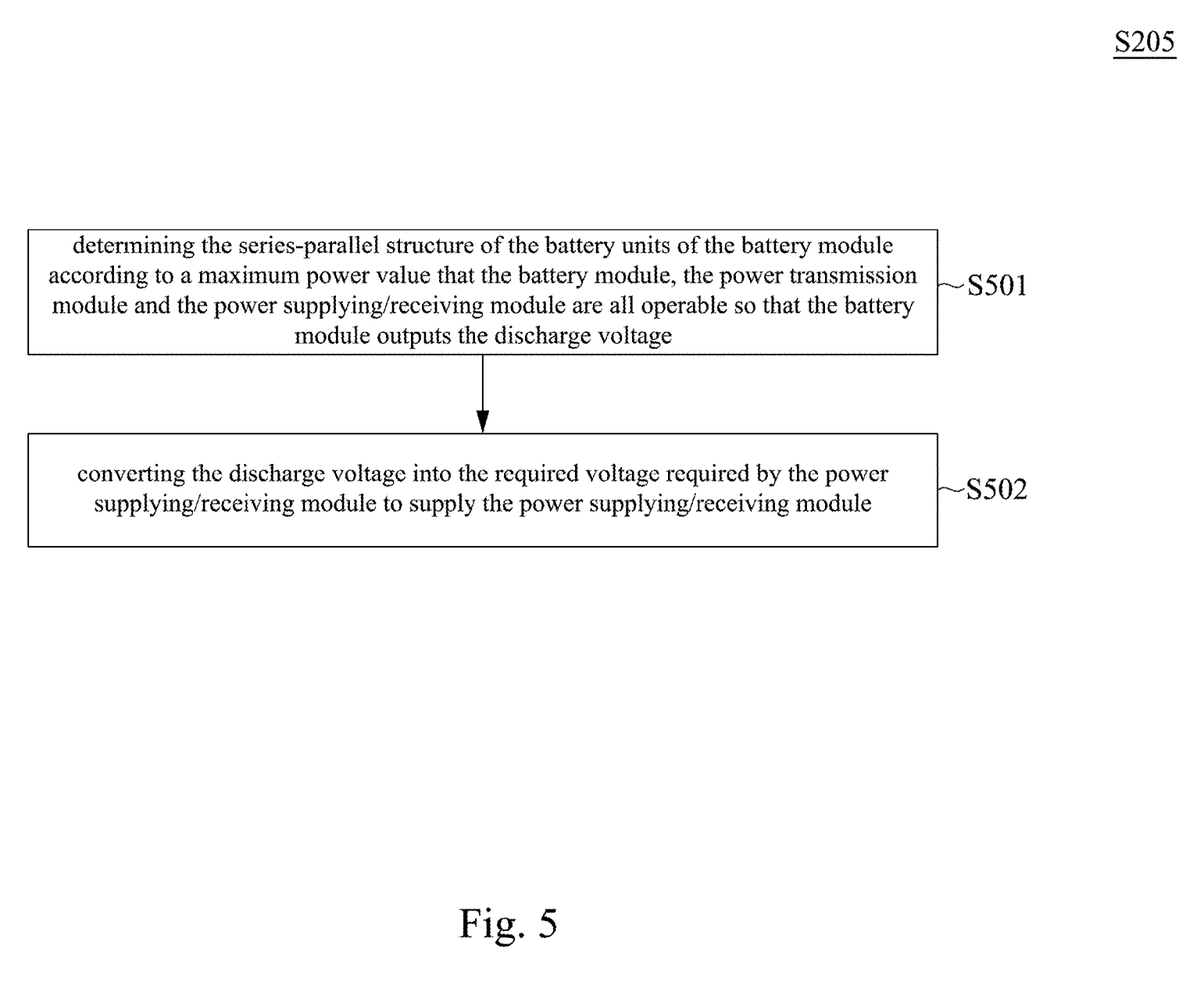
FIG. 5 is a flow diagram of one of steps of the power transmission method of FIG. 2.

Referring to FIG. 5, FIG. 5 is a flow diagram that the battery module 30 performs the discharging operation in the maximum power mode in accordance with some embodiments of the present disclosure. As shown in FIG. 5, step S205 includes sub-steps S501-S502. In step S501, the power transmission module 10 determines the series-parallel structure of the battery units 303 of the battery module 30 according to a maximum power value that the battery module 30, the power transmission module 10 and the power supplying/receiving module 20 are all operable, so that the battery module 30 output the discharge voltage Vdis. For example, a maximum current value that a transmission cable (e.g., USB Type-C) coupled between the power transmission module 10 and the battery module 30 can transmit is 5A, and the battery voltage Vbat generated by the battery units 303 can be 20, 40 or 80V. In such condition, the maximum power value of the battery module 30 is 400 W. If determining that both the power transmission module 10 and the power supplying/receiving module 20 can also load the power value of 400 W, the power transmission module 10 can inform the battery management unit 301 to adjust the series-parallel structure of the battery units 303 to be 20S1P by the processing circuit 102, so that the battery module 30 can output the battery voltage Vbat of 80V as the discharge voltage Vdis. In another example, the maximum power value (e.g., 240 W) that the power transmission module 10 can load is smaller than the maximum power value (e.g., 400 W) of the battery module 30. Accordingly, the power transmission module 10 determines the series-parallel structure of the battery units 303 according to the maximum power value that the power transmission module 10 can load, so that the power value outputted by the battery module 30 is close to and does not exceed the maximum power value that the power transmission module 10 can load.

In sub-step S502, the power transmission module 10 converts the discharge voltage Vdis into the required voltage Vreq required by the power supplying/receiving module 20 to supply the power supplying/receiving module 20. For example, the required voltage is 48V. In comparison to the system which is unable to change the battery voltage Vbat, the power transmission system 100 can dramatically increase the power outputted by the battery module 30 to meet the requirement of the power supplying/receiving module 20.

In some embodiments, the power transmission module 10 determines to perform the discharging operation in the optimal efficiency mode between the battery module 30 and the power supplying/receiving module 20, so as to execute step S206. As shown in FIG. 2, in step S206, the power transmission module 10 controls the battery module 30 to perform the discharging operation in the optimal efficiency mode with the power supplying/receiving module 20. The discharging operation that the battery module 30 performs in the optimal efficiency mode would be described in detail below with reference to FIG. 6.

Figure 6:
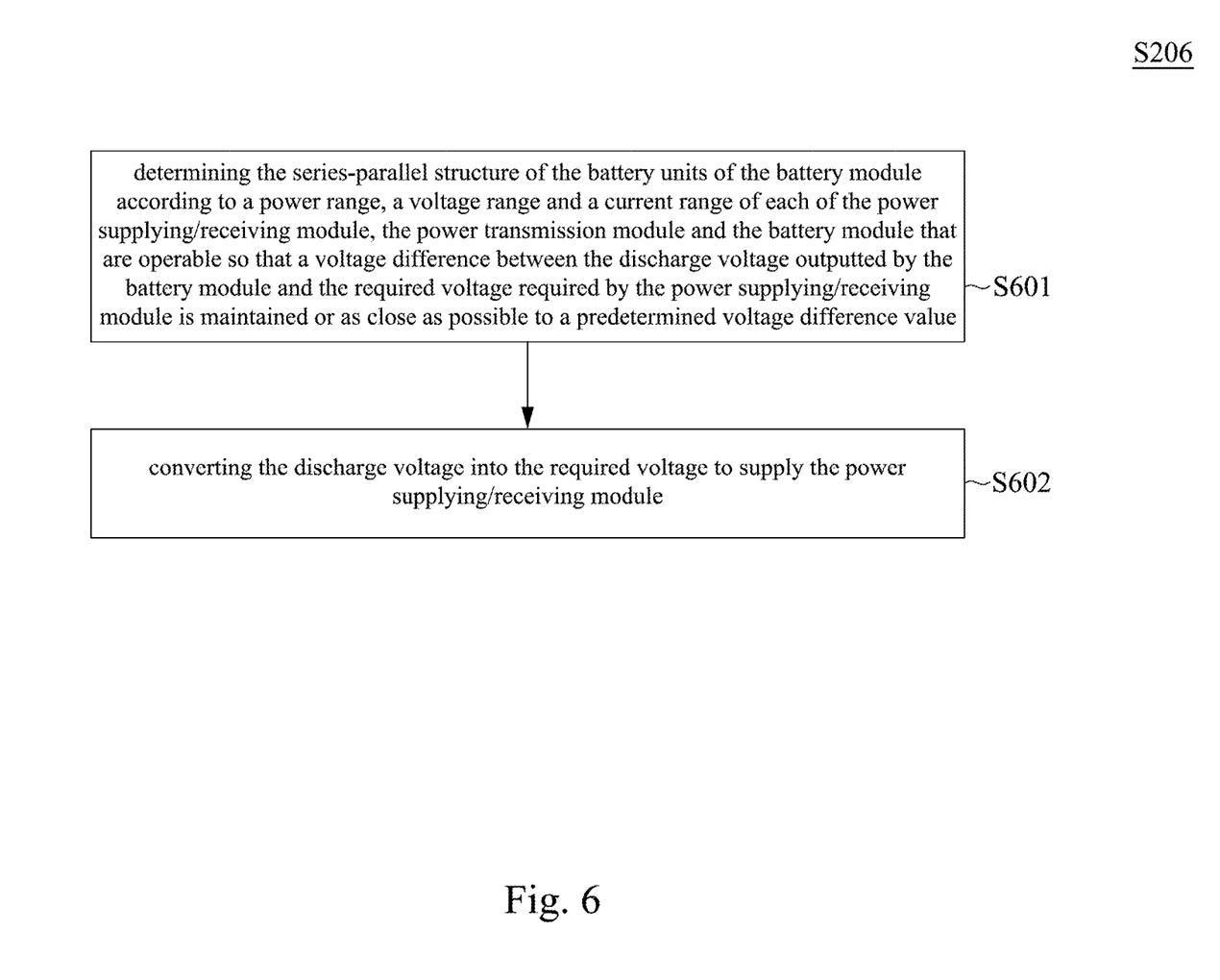
FIG. 6 is a flow diagram of one of steps of the power transmission method of FIG. 2.

Referring to FIG. 6, FIG. 6 is a flow diagram that the battery module 30 performs the discharging operation in the optimal efficiency mode in accordance with some embodiments of the present disclosure. As shown in FIG. 6, step S206 includes sub-steps S601-S602. In step S601, the power transmission module 10 determines the series-parallel structure of the battery units 303 of the battery module 30 according to a power range, a voltage range and a current range of each of the power supplying/receiving module 20, the power transmission module 10 and the battery module 30 that are operable, so that a voltage difference between the discharge voltage Vdis outputted by the battery module 30 and the required voltage Vreq required by the power supplying/receiving module 20 is maintained or as close as possible to the predetermined voltage difference value. For example, the required voltage Vreq is 48V, and the predetermined voltage difference value is 2V (that is, the discharge voltage Vdis is 2V higher than the required voltage Vreq). If the battery units 303 has the structure of 10S2P (which is corresponding to the battery voltage of 40V), the battery module 30 can output the battery voltage Vbat of 40V as the discharge voltage Vdis. Accordingly, the power transmission module 10 can inform the battery management unit 301 to adjust the series-parallel structure of the battery units 303 to be 10S2P by the processing circuit 102, so that the voltage difference (i.e., −8V) between the discharge voltage Vdis and the required voltage Vreq can be as close as possible to 2V.

In sub-step S602, the power transmission module 10 converts the discharge voltage Vdis into the required voltage Vreq to supply the power supplying/receiving module 20. It can be appreciated that since the voltage difference between the discharge voltage Vdis and the required voltage Vreq (that is, the input voltage and the output voltage of the voltage conversion circuit 101) is maintained or as close as possible to the predetermined voltage difference value, the conversion efficiency of the power transmission module 10 and the discharge endurance of the battery module 30 can be increased.

In some embodiments, the power transmission module 10 determines that the battery module 30 performs the discharging operation in the combination of the maximum power mode and the optimal efficiency mode with the power supplying/receiving module 20. In some practical applications, when determining the series-parallel structure of the battery units 303, in addition to considering the maximum power value that the battery module 30, the power transmission module 10 and the power supplying/receiving module 20 are all operable, the power transmission module 10 also makes the voltage difference between the discharge voltage Vdis outputted by the battery module 30 and the required voltage Vreq required by the power supplying/receiving module 20 to be maintained or as close as possible to the predetermined voltage difference value. In such way, in addition to allowing the battery module 30 to have the certain output power, the conversion efficiency of the power transmission module 10 can be increased as high as possible.

In the above embodiments, after determining the series-parallel structure of the battery units 303, the power transmission module 10 does not adjust the series-parallel structure of the battery units 303 again during the following charging or discharging procedure. However, the present disclosure is not limited herein. In other embodiments, even if the series-parallel structure of the battery units 303 has been determined, the power transmission module 10 can still adjust the series-parallel structure of the battery units 303 during the charging or discharging procedure of the battery module 30, depending on the condition, so that the voltage difference between the input voltage and the output voltage of the voltage conversion circuit 101 is maintained or as close as possible to the predetermined voltage difference value. The descriptions are made in detail below by taking multiple practical applications as example.

In a practical application, the battery module 30 would perform the charging operation. The predetermined voltage difference value is 2V (for example, the supply voltage Vsup is 2V higher than the charging voltage Vcha), the maximum current value that the transmission cable can load is 5A, the supply voltage Vsup is in the range of 5 to 36V, and the maximum power value of the power supplying/receiving module 20 is 80 W. The battery units 303 of the battery module 30 can be switched between three series-parallel structure (including 3S4P, 6S2P and 12S1P), wherein the charging voltage Vcha corresponding to the structure of 3S4P is in the range of 7.2 to 12.6V, the charging voltage Vcha corresponding to the structure of 6S2P is in the range of 14.4 to 25.2V, and the charging voltage Vcha corresponding to the structure of 12S1P is in the range of 28.8 to 50.4V. The power transmission module 10 first determines to adjust the series-parallel structure of the battery units 303 to be the structure of 12S1P according to the above information. During the charging procedure of the battery module 30, the charging voltage Vcha is gradually increased from 28.8V, and the supply voltage Vsup is controlled to be gradually increased from 30.8V. When the charging voltage Vcha reaches 34V, the power transmission module 10 controls the battery module 30 to adjust the battery units 303 to be the structure of 6S2P, so that the voltage difference between the supply voltage Vsup and the charging voltage Vcha can be maintained at 2V. After the battery units 303 are adjusted to has the structure of 6S2P, the charging voltage Vcha is correspondingly decreased to 17V. The power transmission module 10 then continues to charge the battery module 30, the charging voltage Vcha is gradually increased from 17 to 25.2V (that is, the battery units 303 would be charged fully), and the supply voltage Vsup is gradually increased from 19 to 27.2V correspondingly. It can be seen from this that by adjusting the series-parallel structure of the battery units 303 during the charging procedure of the battery module 30, the supply voltage Vsup can be always maintained to be 2V higher than the charging voltage Vcha, and the power supplying/receiving module 20 can continually output at the maximum power value. In such way, the conversion efficiency of the power transmission module 10 and the charge speed of the battery module 30 can be increased.

In another practical application, the battery module 30 would perform the discharging operation. The predetermined voltage difference value is 2V (for example, the discharge voltage Vdis is 2V higher than the required voltage Vreq), the power supplying/receiving module 20 requests a voltage of 9V (i.e., the required voltage Vreq) and a power of 27 W, and the maximum current value that the transmission cable coupled between the battery module 30 and the power transmission module 10 can load is 3A. The battery units 303 of the battery module 30 can be switched between three series-parallel structure (including 3S4P, 6S2P and 12S1P). The power transmission module 10 first determines to adjust the battery units 303 to have the structure of 3S4P (which is corresponding to the discharge voltage Vdis in the range of 7.2 to 12.6V) according to the above information. During the discharging procedure of the battery module 30, the discharge voltage Vdis is gradually decreased from 12.6V. It can be appreciated that it is assumed that the conversion efficiency of the power transmission module 10 is 95%, when the discharge voltage Vdis is lower than 9.47V, the battery module 30 (or the power transmission module 10) would be unable to output at the power value of 27 W due to the restriction of the transmission cable. Accordingly, when the discharge voltage is decreased to 9.47V, the power transmission module 10 would request the battery module 30 to adjust the battery units 303 to have the structure of 6S2P. After the battery units 303 are adjusted to have the structure of 6S2P, the discharge voltage Vdis is correspondingly increased to 18.94V, so that the battery module 30 (or the power transmission module 10) is able to output at the power value of 27 W. It can be seen from this that by adjusting the series-parallel structure of the battery units 303 during the discharging procedure of the battery module 30, the power transmission module 10 can continually operate at the optimal conversion efficiency and can continually meet the requirement of the power supplying/receiving module 20.

In the above embodiments, as shown in FIGS. 3 and 4, the power transmission module 10 outputs the charging voltage Vcha by the voltage conversion circuit 101 to charge the battery module 30, but the present disclosure is not limited herein. In other embodiments, the power transmission module 10 further includes a voltage-to-current conversion circuit (not shown), and the power transmission module 10 can convert the supply voltage Vsup into a charge current (not shown) by the voltage-to-current conversion circuit to charge the battery module 30.

In the above embodiments, as shown in FIGS. 1-6, the battery management unit 301 can adjust the series-parallel structure of the battery units 303 by the switch circuit 302, but the present disclosure is not limited herein. In other embodiments, the series-parallel structure of the battery units 303 is not adjustable, so that the switch circuit 302 of the battery module can be omitted. It can be appreciated that in the embodiments that the series-parallel structure of the battery units 303 is not adjustable, the above operations related to adjusting the series-parallel structure of the battery units 303 are omitted. For example, the battery units 303 has the fixed series-parallel structure of 5S4P (which is corresponding to the battery voltage Vbat of 20V), and the charging voltage Vcha is varies in the range of 12 to 21V at this time. When performing the charging operation in the maximum power mode, the power transmission module 10 would still determine the supply voltage Vsup according to the maximum power value that the power supplying/receiving module 20, the power transmission module 10 and the battery module 30 are all operable. When performing the charging operation in the optimal efficiency mode, the power transmission module 10 would still control the supply voltage Vsup so that the voltage difference between the charging voltage Vcha and the supply voltage Vsup is maintained at the predetermined voltage difference value. Other operations can be deduced by analogy, and therefore the descriptions thereof are omitted herein.

In the above embodiments, when determining the charging voltage Vcha, the discharge voltage Vdis and/or the supply voltage Vsup, the processing circuit 102 of the power transmission module 10 would consider the maximum power value that three modules (i.e., the power transmission module 10, the power supplying/receiving module 20 and the battery module 30) are all operable and/or the voltage, current, and power range of each of three modules that are operable, but the present disclosure is not limited herein. The processing circuits 102 may also consider the withstanding of the voltage, current and power range of the multiple transmission cables coupled between three modules to make sure all the modules operable. In addition, in the above embodiments, the predetermined voltage difference value is a fixed value during the charging and discharging procedure, but the present disclosure is not limited herein. In other embodiments, the predetermined voltage difference value is a variable value during the charging and discharging procedure.

In the embodiment of FIG. 1, the power transmission module 10, the power supplying/receiving module 20 and the battery module 30 are configured independently, but the present disclosure is not limited herein. In other embodiments, the configuration of the power transmission module 10 can be varied according to the requirement. The different configurations of the power transmission module 10 are described below with reference to FIGS. 7 and 8.

Figure 7:
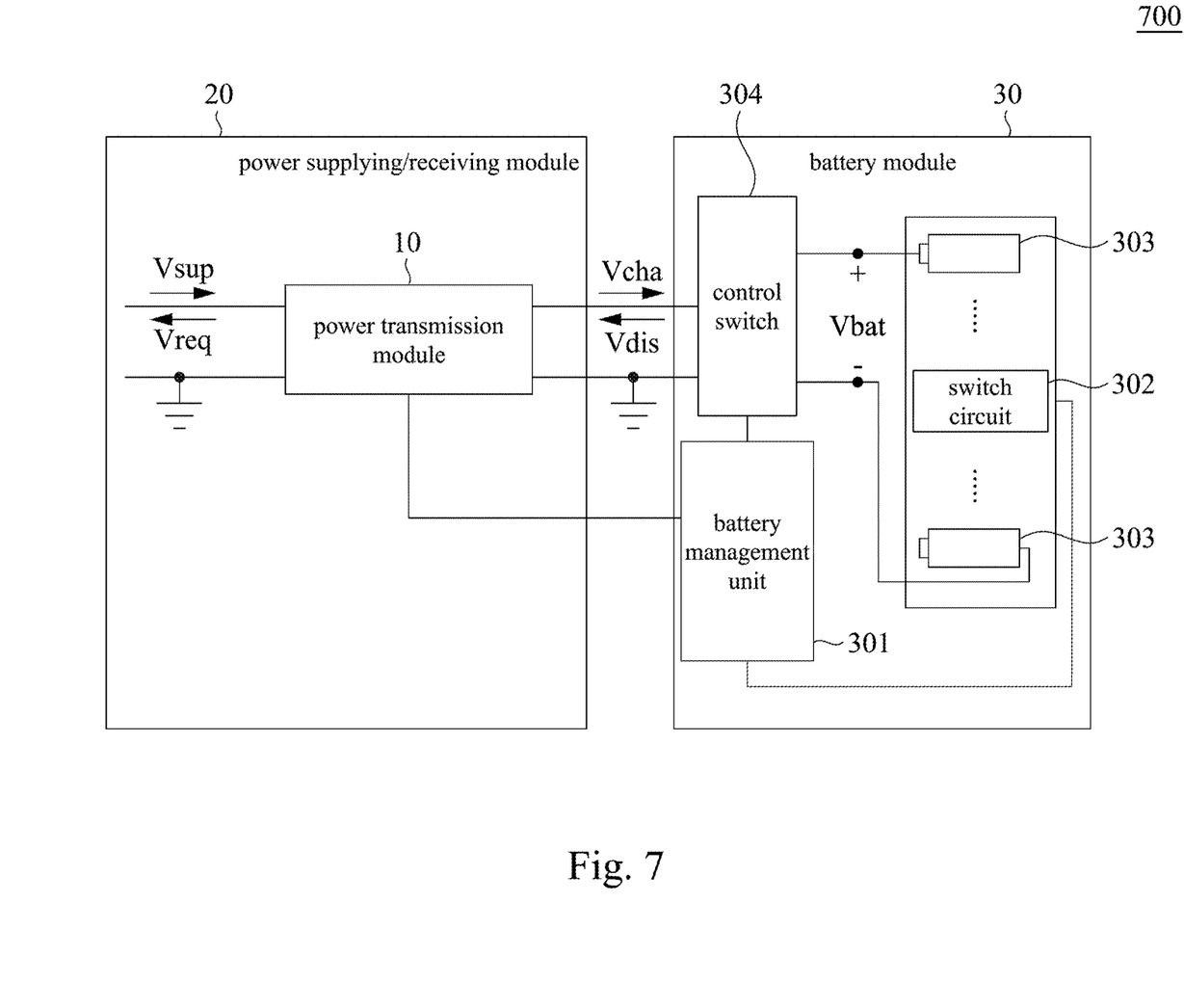
FIG. 7 is a schematic diagram of a power transmission system in accordance with other embodiments of the present disclosure.

Referring to FIG. 7, FIG. 7 is a schematic diagram of a power transmission system 700 in accordance with some embodiments of the present disclosure. As shown in FIG. 7, the power transmission module 10 is configured in the power supplying/receiving module 20 (or is integrated together with the power supplying/receiving module 20). The other arrangement and operation of the power transmission system 700 are same or similar to those of the above embodiments, and therefore the descriptions thereof are omitted herein.

Figure 8:
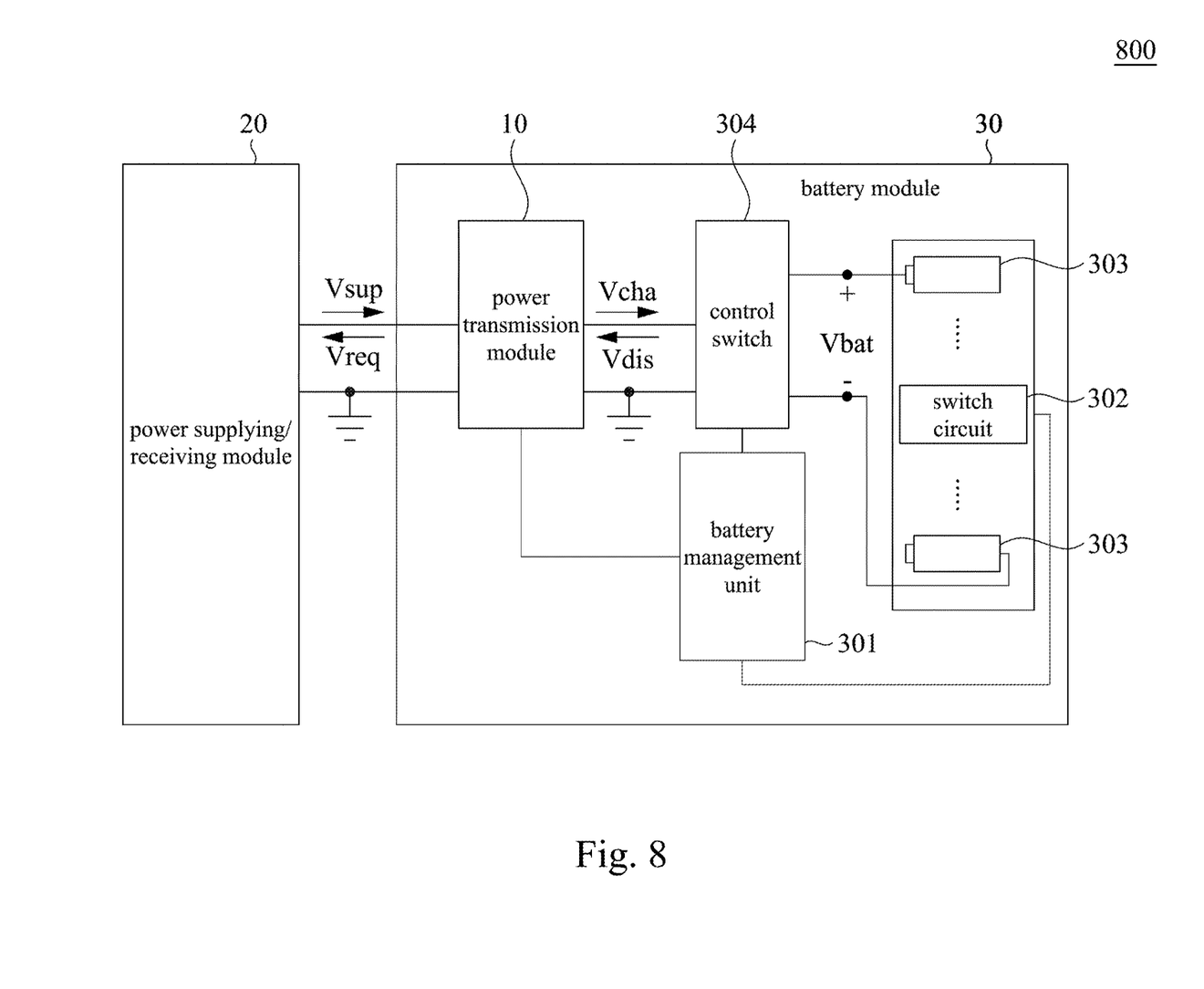
FIG. 8 is a schematic diagram of a power transmission system in accordance with other embodiments of the present disclosure.

Referring to FIG. 8, FIG. 8 is a schematic diagram of a power transmission system 800 in accordance with some embodiments of the present disclosure. As shown in FIG. 8, the power transmission module 10 is configured in the battery module 30 (or is integrated together with the battery module 30). Although the power transmission module 10 and the battery management unit 301 are configured independently in FIG. 8, it can be appreciated that the power transmission module 10 can also be integrated together with the battery management unit 301. The other arrangement and operation of the power transmission system 800 are same or similar to those of the above embodiments, and therefore the descriptions thereof are omitted herein.

It can be seen from the above embodiments of the present disclosure that the power transmission system 100 of the present disclosure coordinates the power transmission between the battery module 30 and the power supplying/receiving module 20 by the power transmission module 10, so as to have the advantage of increased conversion efficiency of power, increased charge efficiency of battery, increased discharge endurance of battery and being suitable for most systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A power transmission system, comprising:
   a power transmission module;
   a power supplying or receiving module coupled to the power transmission module, and is one of a power supply and an electronic device; and
   a battery module comprising a plurality of battery units, coupled to the power transmission module and configured to perform a charging operation or a discharging operation with the power supplying or receiving module through the power transmission module;
   wherein the battery module is configured to perform the charging operation with the power supply, the power transmission module is configured to adjust a supply voltage outputted by the power supply according to handshake information, is configured to adjust a series-parallel structure of the battery units according to the handshake information, and is configured to convert the supply voltage into a charging voltage received by the battery module to charge the battery units;
   wherein the battery module is configured to perform the discharging operation with the electronic device, the power transmission module is configured to adjust the series-parallel structure of the battery units according to the handshake information, and is configured to convert a discharge voltage outputted by the battery module into a required voltage required by the electronic device to supply the electronic device;
   wherein the battery module performs the charging operation or the discharging operation in a maximum power mode, an optimal efficiency mode or a combination thereof with the power supplying or receiving module.

2. The power transmission system of claim 1, wherein when the battery module performs the charging operation with the power supply in the maximum power mode, the power transmission module is configured to determine the supply voltage according to a maximum power value that the power supply, the power transmission module and the battery module are all operable, and is configured to determine the series-parallel structure of the battery units according to the supply voltage so that a voltage difference between the charging voltage and the supply voltage is maintained or as close as possible to a predetermined voltage difference value.

3. The power transmission system of claim 1, wherein when the battery module performs the charging operation with the power supply in the optimal efficiency mode, the power transmission module is configured to determine the series-parallel structure of the battery units according to a power range, a voltage range and a current range of each of the power supply, the power transmission module and the battery module that are operable, and is configured to dynamically adjust the supply voltage outputted by the power supply so that a voltage difference between the supply voltage and the charging voltage is maintained at a predetermined voltage difference value.

4. The power transmission system of claim 3, wherein when the voltage difference between the supply voltage and the charging voltage is unable to be maintained at the predetermined voltage difference value, the power transmission module is configured to control the supply voltage outputted by the power supply or/and the series-parallel structure of the battery units so that the voltage difference between the supply voltage and the charging voltage is as close as possible to the predetermined voltage difference value.

5. The power transmission system of claim 1, wherein when the battery module performs the discharging operation with the electronic device in the maximum power mode, the power transmission module is configured to determine the series-parallel structure of the battery units according to a maximum power value that the battery module, the power transmission module and the electronic device are all operable so that a voltage difference between the discharge voltage and the required voltage is maintained or as close as possible to a predetermined voltage difference value.

6. The power transmission system of claim 1, wherein when the battery module performs the discharging operation with the electronic device in the optimal efficiency mode, the power transmission module is configured to determine the series-parallel structure of the battery units according to a power range, a voltage range and a current range of each of the electronic device, the power transmission module and the battery module that are operable so that a voltage difference between the discharge voltage and the required voltage is maintained at a predetermined voltage difference value.

7. The power transmission system of claim 1, wherein the power transmission module comprises a voltage conversion circuit and a processing circuit, the voltage conversion circuit is configured to perform a voltage conversion, and the processing circuit is configured to perform a handshake procedure with the battery module and the power supplying or receiving module to obtain the handshake information and is configured to control the voltage conversion circuit and transmit a control request to the power supplying or receiving module and the battery module according to the handshake information.

8. The power transmission system of claim 1, wherein the power transmission module is independent from the battery module and the power supplying or receiving module, or is integrated with the battery module or the power supplying or receiving module.

9. A power transmission method applied to a power transmission module, comprising:
   determining to perform a charging operation or a discharge operation between a battery module and a power supplying or receiving module according to handshake information obtained from a handshake procedure performed by the power transmission module, wherein the power supplying or receiving module is one of a power supply and an electronic device;

wherein performing the charging operation between the battery module and the power supply comprises:
adjusting a supply voltage outputted by the power supply according to the handshake information;
adjusting a series-parallel structure of a plurality of battery units of the battery module according to the handshake information; and
converting the supply voltage into a charging voltage received by the battery module to charge the battery units;

wherein performing the discharging operation between the battery module and the electronic device comprises:
adjusting the series-parallel structure of the battery units according to the handshake information; and
converting a discharge voltage outputted by the battery module into a required voltage required by the electronic device to supply the electronic device;

wherein the charging operation or the discharging operation is performed in a maximum power mode, an optimal efficiency mode or a combination thereof between the battery module and the power supplying or receiving module.

10. The power transmission method of claim 9, wherein performing the charging operation between the battery module and the power supply in the maximum power mode comprises:
determining the supply voltage according to a maximum power value that the power supply, the power transmission module and the battery module are all operable; and
determining the series-parallel structure of the battery units according to the supply voltage so that a voltage difference between the charging voltage and the supply voltage is maintained or as close as possible to a predetermined voltage difference value.

11. The power transmission method of claim 9, wherein performing the charging operation between the battery module and the power supply in the optimal efficiency mode comprises:
determining the series-parallel structure of the battery units according to a power range, a voltage range and a current range of each of the power supply, the power transmission module and the battery module that are operable; and
dynamically adjusting the supply voltage outputted by the power supply so that a voltage difference between the supply voltage and the charging voltage is maintained at a predetermined voltage difference value.

12. The power transmission method of claim 11, further comprising:
in the event of the voltage difference between the supply voltage and the charging voltage is unable to be maintained at the predetermined voltage difference value, controlling the supply voltage outputted by the power supply or/and the series-parallel structure of the battery units so that the voltage difference between the supply voltage and the charging voltage is as close as possible to the predetermined voltage difference value.

13. The power transmission method of claim 9, wherein performing the discharging operation between the battery module and the electronic device in the maximum power mode comprises:
determining the series-parallel structure of the battery units according to a maximum power value that the battery module, the power transmission module and the electronic device are all operable so that a voltage difference between the discharge voltage and the required voltage is maintained or as close as possible to a predetermined voltage difference value.

14. The power transmission method of claim 9, wherein performing the discharging operation between the battery module and the electronic device in the optimal efficiency mode comprises:
determining the series-parallel structure of the battery units according to a power range, a voltage range and a current range of each of the electronic device, the power transmission module and the battery module that are operable so that a voltage difference between the discharge voltage and the required voltage is maintained at a predetermined voltage difference value.

15. A power transmission system, comprising:
a power transmission module for coupling to a power supply; and
a battery module, comprising a plurality of battery units, coupled to the power transmission module, and configured to be charged by the power supply through the power transmission module;
wherein the power transmission module is configured to perform a handshake procedure with the battery module and the power supply to obtain handshake information, is configured to adjust a series-parallel structure of the battery units of the battery module according to the handshake information, and is configured to convert a supply voltage outputted by the power supply into a charging voltage to charge the battery module;
wherein the power transmission module configures the battery module to be charged by the powers supply in a maximum power mode, an optimal efficiency mode or a combination thereof.

16. A power transmission system, comprising:
a power transmission module for coupling to an electronic device; and
a battery module, comprising a plurality of battery units, coupled to the power transmission module, and configured to supply the electronic device through the power transmission module;
wherein the power transmission module is configured to perform a handshake procedure with the battery module and the electronic device to obtain handshake information, is configured to adjust a series-parallel structure of the battery units of the battery module according to the handshake information, and is configured to convert a discharge voltage outputted by the battery module into a required voltage required by the electronic device to supply the electronic device;
wherein the power transmission module configures the battery module to supply the electronic device in a maximum power mode, an optimal efficiency mode or a combination thereof.

* * * * *